United States Patent
Jung

(10) Patent No.: US 7,440,031 B2
(45) Date of Patent: Oct. 21, 2008

(54) DEINTERLACING APPARATUS AND METHOD USING DETECTED JUDDER

(75) Inventor: You-young Jung, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 628 days.

(21) Appl. No.: 11/061,524

(22) Filed: Feb. 22, 2005

(65) Prior Publication Data

US 2005/0275753 A1 Dec. 15, 2005

(30) Foreign Application Priority Data

Jun. 15, 2004 (KR) .................. 10-2004-0043915

(51) Int. Cl.
*H04N 7/01* (2006.01)

(52) U.S. Cl. ...................................... 348/452

(58) Field of Classification Search ................ 348/441, 348/443, 464, 448, 452, 458, 459, 451, 449
See application file for complete search history.

(56) References Cited

U.S. PATENT DOCUMENTS

| | | | | |
|---|---|---|---|---|
| 5,036,393 | A | * 7/1991 | Samad et al. | ................ 348/452 |
| 5,208,667 | A | * 5/1993 | Saunders | ..................... 348/452 |
| 5,353,119 | A | * 10/1994 | Dorricott et al. | ............ 348/446 |
| 5,625,421 | A | 4/1997 | Faroudja et al. | |
| 5,936,676 | A | 8/1999 | Ledinh et al. | |
| 6,396,543 | B1 | 5/2002 | Shin et al. | |
| 6,611,294 | B1 | 8/2003 | Hirano et al. | |
| 6,630,961 | B1 | 10/2003 | Shin et al. | |
| 2002/0130969 | A1 | 9/2002 | Han et al. | |

(Continued)

FOREIGN PATENT DOCUMENTS

EP 0883298 12/1998

(Continued)

OTHER PUBLICATIONS

Dutch Search Report dated Mar. 7. 2006 issued in NL1028888.

(Continued)

*Primary Examiner*—Paulos M Natnael
(74) *Attorney, Agent, or Firm*—Stanzione & Kim, LLP

(57) ABSTRACT

A deinterlacing apparatus using judder detection includes a motion detection unit to extract an extent of motion between a previous field and a next field according to a pixel of a current field of input image; a film mode decision unit to determine if an input image source is in a film mode; an intra-field interpolation unit to calculate a first interpolation value using surrounding pixel values according to a directional value included in the surrounding pixel values of a pixel to be interpolated in the current field of the input image; an inter-field interpolation unit to calculate a second interpolation value using pixel values of the previous field and the next field corresponding to the pixel to be interpolated in the current field of the input image; and a mixing unit to receive three or more adjacent input lines extracted from the current field and at least one line extracted from a field interpolated in the inter-field interpolation unit and detecting judder, and to selectively output one of an output value of the inter-field interpolation unit and an output value of an intra-field interpolation unit depending on the judder detected.

58 Claims, 5 Drawing Sheets

U.S. PATENT DOCUMENTS

2003/0156301 A1    8/2003    Kempf et al.
2005/0162550 A1*    7/2005    Kondo et al. ................ 348/458

FOREIGN PATENT DOCUMENTS

| JP | 2000-341648 | 12/2000 |
|---|---|---|
| JP | 2002-290927 | 10/2002 |
| JP | 2004-064788 | 2/2004 |
| KR | 2003-59361 A | 7/2003 |

OTHER PUBLICATIONS

Japanese Office Action dated Oct. 9, 2007 issued in JP 2005-137791.

* cited by examiner

DEINTERLACING APPARATUS AND METHOD USING DETECTED JUDDER

CROSS-REFERENCE TO RELATED APPLICATIONS

This application claims the benefit under 35 U.S.C. § 119 from Korean Patent Application No. 2004-43915 filed on Jun. 15, 2004 with the Korean Intellectual Property Office, the disclosure of which is incorporated herein in its entirety by reference.

BACKGROUND OF THE INVENTION

1. Field of the Invention

The present general inventive concept generally relates to a deinterlacing apparatus and a method using judder detection. More specifically, the present general inventive concept relates to a deinterlacing apparatus and a method using the judder detection in which judder generated in a process of deinterlacing can be detected and eliminated.

2. Description of the Related Art

Scanning methods for implementing a screen in an image display device include an interlaced scanning method and a progressive scanning method (i.e., a non-interlaced scanning method).

The interlaced scanning method is a method in which a frame of a displayed image is divided into two fields and the two fields are alternately displayed on the screen, with the two fields typically being referred to as a top field and a bottom field, an odd-numbered field and an even-numbered field, or an upper field and a lower field.

The progressive scanning method is a method in which an entire frame of the displayed image is displayed at a time, in a frame by frame manner, such as in a movie in which an individual screen is carried and stored on a film and projected onto the screen.

If the image is displayed on a large display device using an interlaced scanning method, a severe flickering is generated in a moving region of the image. Thus, efforts to employ the progressive scanning method in large display devices, such as a large computer monitor or a high definition TV, have recently increased.

Therefore, in order to display an interlaced scanning image as a progressive scanning image, a deinterlacing scheme, in which image lines that are not present in the existing interlaced scanning image are generated to display the image, is used to convert the interlaced scanning image into the progressive scanning image.

The deinterlacing scheme mainly uses a method in which an intra-field interpolation pixel and an inter-field interpolation pixel are switched according to motion information or a film mode of the interlaced scanning image.

The deinterlacing scheme utilizes intra-field interpolation when a motion vector is in a still region or the film mode. If the intra-field interpolation is used according to wrong film information or when the motion vector is in a motion region, judder is generated in the motion region. As a result, when dealing with motion in the interlaced scanning image, frequency of problems caused by judder has increased.

SUMMARY OF THE INVENTION

The present general inventive concept provides a deinterlacing apparatus and a method using judder detection in which judder generated in a moving region and/or the vicinity of the motion region can effectively be detected and eliminated according to an intra-field interpolation using film information or an inter-field interpolation when in the motion region.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a deinterlacing apparatus using judder detection, the deinterlacing apparatus comprising a motion detection unit to extract an extent of motion between a previous field and a next field according to a corresponding pixel of a current field of an input image; a film mode decision unit to determine if an input image source is in a film mode; an intra-field interpolation unit to calculate a first interpolation value using surrounding pixel values according to a direction included in the surrounding pixel values of a pixel to be interpolated in the current field of the input image; an inter-field interpolation unit to calculate a second interpolation value using pixel values of the previous field and the next field corresponding to the pixel to be interpolated in the current field of the input image; and a mixing unit to receive three or more adjacent input lines extracted from the current field of the input image and at least one line extracted from a field interpolated in the inter-field interpolation unit to detect judder therefrom, and to selectively output one of an output value of the inter-field interpolation unit and an output value of an intra-field interpolation unit depending on the judder detected.

The mixing unit may comprise at least one judder detection unit to detect the judder in the three or more adjacent input lines, and a switching unit to output the output value of the intra-field interpolation unit if the motion detection unit determines that there is no motion between the previous field and the next field and/or the film determination unit determines that the input image source is in the film mode, and to output the output value of the intra-field interpolation unit if judder is detected by the judder detection unit.

The judder detection unit may comprise a median filtering unit to extract a median pixel value from the three or more adjacent input lines; an absolute value calculating unit to calculate an absolute value of a difference between the extracted median pixel value and a pixel value of an intermediate line of the three or more adjacent input lines; and a judder discrimination unit to compare the calculated absolute value and a judder threshold value and to discriminate the judder (i.e., determine if the judder exceeds a predetermined level set by the judder threshold).

The judder detection unit may further comprise an extension unit to extend a region, in which the judder is detected, in horizontal and vertical directions, and to output the judder if an output value of the judder discrimination unit in the extended judder detection region is greater than the judder threshold value.

The judder detection unit may further comprise a threshold value calculating unit to calculate the judder threshold value according to pixel values of the three or more adjacent input lines and a predetermined threshold value and to provide the judder threshold value to the judder discrimination unit.

The threshold value calculating unit may comprise a first average pixel extracting unit to calculate average pixel values on odd-numbered lines of the three or more adjacent input lines; a second average pixel extracting unit to calculate average pixel values on even-numbered lines of the three or more adjacent input lines; an absolute value extracting unit to calculate an absolute value of a difference between the calculated average pixel values on the odd-numbered lines and the calculated average pixel values on the even-numbered lines; and a limiter to limit the calculated absolute value by the predetermined threshold including a maximum threshold value and a minimum threshold value.

The limiter scales-down the calculated absolute value in a prescribed ratio, compares the scaled-down absolute value and the minimum threshold value, thereby extracting a greater value, compares the greater extracted value and the maximum threshold value, thereby extracting a smaller value, and provides the extracted smaller value to the judder discrimination unit.

The foregoing and/or other aspects and advantages of the present general inventive concept may be achieved by providing a deinterlacing method using judder detection, the method comprising the operations of calculating a first interpolation value using surrounding pixel values according to a direction included in the surrounding pixel values of a pixel to be interpolated in a current field of an input image; calculating a second interpolation value using pixel values of a previous field and a next field corresponding to the pixel to be interpolated in the current field of the input image; extracting an extent of motion between the previous field and the next field according to a corresponding pixel of the current field of the input image; determining if an input image source is in a film mode; receiving three or more adjacent input lines extracted from the current field and at least one line extracted from a field interpolated according to the second interpolation value and detecting judder therein; and outputting an output value interpolated according to the first interpolation value if the input image is determined to have no motion and/or that the input image source is in the film mode, and outputting an output value interpolated according to the first interpolation value if judder is detected by the judder detection operation.

An operation of detecting the judder may comprise the operations of extracting a median pixel value from the three or more adjacent input lines; calculating an absolute value of a difference between the extracted median pixel value and a pixel value of an intermediate line of the three or more adjacent input lines; and comparing the calculated absolute value and a judder threshold value and discriminating the judder (i.e., determining if the judder exceeds a predetermined level set by the judder threshold).

The method may further comprise operations of extending a region, in which the judder is detected, in horizontal and vertical directions, and outputting the judder if the judder detected in the extended judder detection region is greater than the judder threshold value.

An operation of calculating a threshold value may calculate judder threshold value based on a predetermined threshold value including maximum and minimum threshold and values of the three or more adjacent input lines.

The operation of calculating the threshold value includes operations of calculating average pixel values on even-numbered lines of the three or more adjacent input lines; calculating average pixel values on odd-numbered lines of the three or more adjacent input lines; calculating an absolute value of a difference between the calculated average pixel values on the odd-numbered lines and the calculated average of the pixel values on the even-numbered lines; and liming the calculated absolute value by a maximum threshold value and a minimum threshold value.

An operation of limiting the calculated absolute value includes operations of scaling-down the calculated absolute value in a prescribed ratio; comparing the scaled-down absolute value and the minimum threshold value, thereby extracting a greater value; comparing the greater extracted value and the maximum threshold value, thereby extracting a smaller value.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
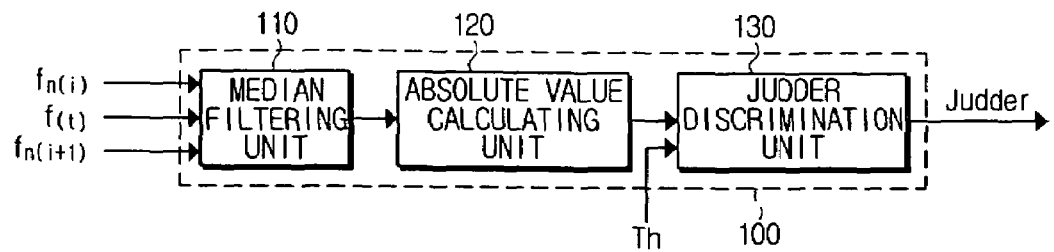
FIG. 1 is a block diagram illustrating a judder detection unit according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 2:
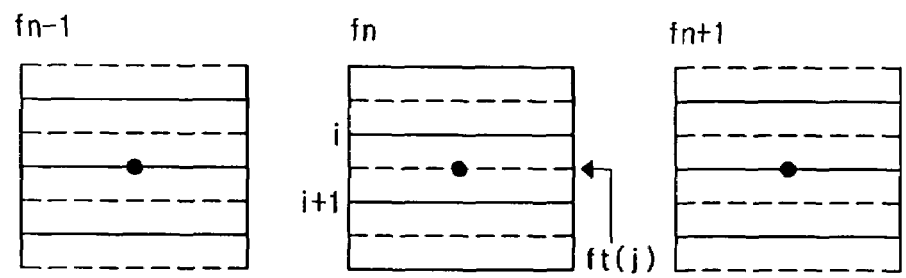
FIG. 2 is a diagram illustrating lines input to the judder detection unit of FIG. 1.

FIG. 1 is a block diagram illustrating an embodiment of a judder detection unit 100 according to an embodiment of the present general inventive concept, and FIG. 2 is a diagram of lines input to the judder detection unit 100 of FIG. 1.

The judder detection unit 100 used in a deinterlacing apparatus using judder detection according to an embodiment of the present general inventive concept includes a median filtering unit 110, an absolute value calculating unit 120, and a judder discrimination unit 130.

The median filtering unit 110 extracts a median pixel value from a plurality of adjacent input lines extracted from a current field and at least one line extracted from a field interpolated in an inter-field interpolation unit described below.

With reference to FIG. 2, three adjacent lines are input to the median filtering unit 110. In FIG. 2, $f_{n-1}$ denotes an (n−1)th field, $f_n$ denotes an n-th field, and $f_{n+1}$ denotes an (n+1)th field, and assuming that the field to be interpolated at present is the current field, $f_n$ becomes the current field, $f_{n+1}$ becomes a previous field, and $f_{n-1}$ becomes a next field.

Each of the three adjacent lines input to the median filtering unit 110 is i-th line ($f_n^{(i)}$) of the current field, (i+1)th line ($f_n^{(i+1)}$) of the current field, and line ($f_t^{(j)}$) interposed between $f_n^{(i)}$ and $f_n^{(i+1)}$, with $f_t$ being one of ($f_{n+1}+f_{n-1}$)/2, $f_{n+1}$, and $f_{n-1}$.

The absolute value calculating unit 120 calculates an absolute value of a difference between the median pixel value extracted from the median filtering unit 110 and a pixel value of an intermediate line of the three adjacent lines input to the median filtering unit 110.

The judder discrimination unit 130 compares the absolute value calculated by the absolute value calculating unit 120 with a judder threshold value (Th), and discriminates and outputs a judder. The judder threshold value is a value that may be set by a user and may be random, and if the absolute value calculated from the absolute value calculating unit 120 is greater than the predetermined threshold value, the judder is discriminated from the judder discrimination unit 130. In other words, the judder discrimination unit determines if the judder exceeds a predetermined level set by the judder threshold.

Figure 3:
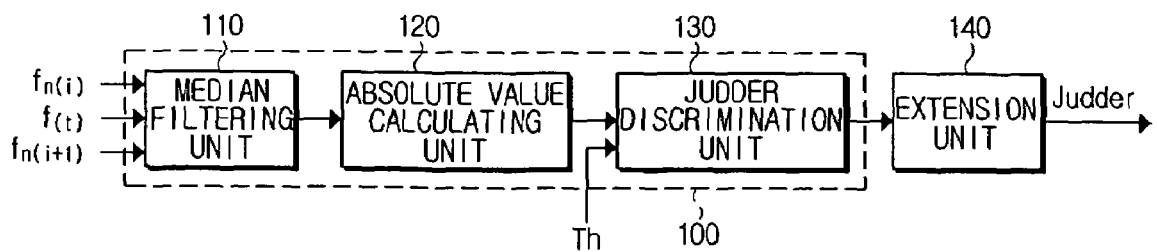
FIG. 3 is a block diagram illustrating another judder detection unit according to another embodiment of the present general inventive concept.

FIG. 3 is a block diagram illustrating another judder detection unit according to another embodiment of the present general inventive concept.

The present embodiment illustrates a configuration in which an expansion unit 140 is added to an output portion of the judder detection unit 100 in order to practically apply the judder detection unit 100 to the deinterlacing apparatus.

Similar to FIG. 1, three adjacent lines are input to the median filtering unit 110, the median pixel value is again extracted, the absolute value of the difference between two pixel values (i.e., the median pixel value of the three adjacent lines and the pixel value of the intermediate line of the three adjacent input lines) is calculated by the absolute value calculating unit 120, and thereby the judder is discriminated from the judder discrimination unit 130.

The extension unit 140 extends a detection region, in which the judder is detected, in horizontal and vertical directions, and if it is determined that pixels (i.e., output pixel values of the judder discrimination unit 130) present in the extended detection region constitute a judder having greater than a prescribed number (i.e., the judder threshold value), the extension unit 140 outputs the judder.

Figure 4:
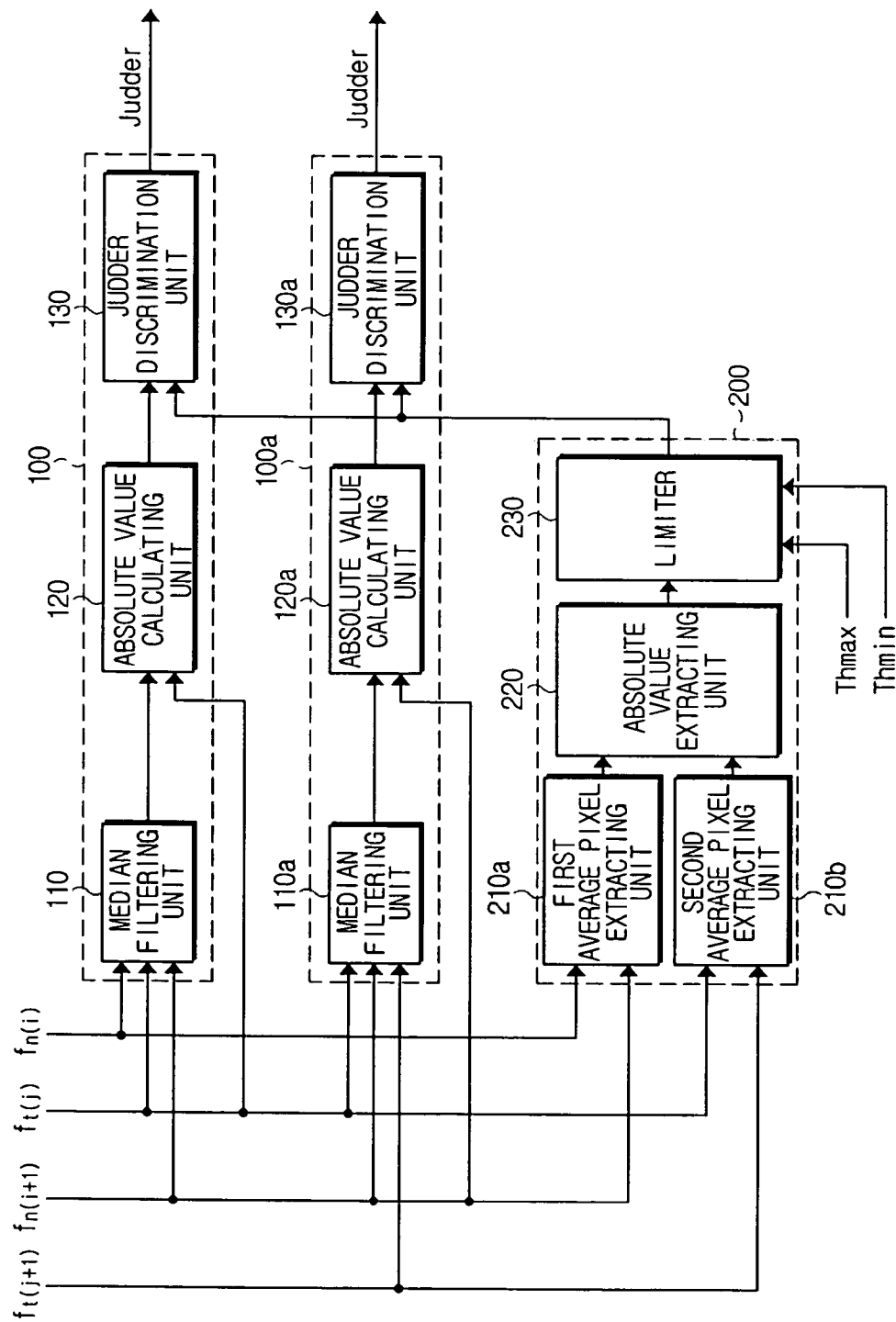
FIG. 4 is a block diagram illustrating another judder detection unit according to another embodiment of the present general inventive concept.

FIG. 4 is a block diagram illustrating another judder detection unit according to another embodiment of the present general inventive concept.

FIG. 4 illustrates a case in which a number of adjacent lines input to the judder detection unit 100 are four or more (e.g., four), and the judder detection unit 100 includes two judder detection units 100 and 100a.

The adjacent lines input to the median filtering units 110 and 110a are extracted out of $f_n^{(i)}$, $f_n^{(i+1)}$, $f_t^{(j)}$, and $f_t^{(j+1)}$. In this embodiment, the median filtering unit 110 is input with $f_n^{(i)}$, $f_t^{(j)}$, and $f_n^{(i+1)}$ and the median filtering unit 110a is input with $f_t^{(j)}$, $f_n^{(i+1)}$, and $f_t^{(j+1)}$. The present general inventive concept is not meant to be limited to these configurations, and other arrays may also be used with the present general inventive concept.

Since functions of the median filtering units 110 and 110a, the absolute value calculating units 120 and 120a, and the judder discrimination units 130 and 130a of the judder detection units 100 and 100a are the same as the embodiments described above, the descriptions thereof will be omitted.

As illustrated in FIG. 4, if the plurality adjacent input lines are four or more, the judder detection unit 100 further includes a threshold value calculating unit 200 to calculate a judder threshold value to be compared in the judder discrimination units 130 and 130a to corresponding absolute values input thereto.

The threshold value calculating unit 200 includes a first average pixel extracting unit 210a, a second average pixel extracting unit 210b, an absolute value extracting unit 220, and a limiter 230.

The first average pixel extracting unit 210a calculates average pixel values of odd-numbered lines ($f_n^{(i)}$, $f_n^{(i+1)}$) of the four or more adjacent input lines.

The second average pixel extracting unit 210b calculates average pixel values of even-numbered lines ($f_t^{(j)}$, $f_t^{(j+1)}$) of the four or more adjacent input lines.

The absolute value extracting unit 220 calculates an absolute value of a difference of the average pixels extracted from the first average pixel extracting unit 210a and the second average pixel extracting unit 210b, respectively.

The limiter 230 limits the absolute value calculated from the absolute value extracting unit 220 by a maximum threshold value ($Th_{max}$) and a minimum threshold value ($Th_{min}$). Each of the maximum threshold value and the minimum threshold value is a value that may be set by a user and may be random.

In this embodiment, the limiter 230 scales-down the absolute value calculated by the absolute value extracting unit 220 in a prescribed ratio, extracts a greater value by comparing the scale-down absolute value with the minimum threshold value ($Th_{min}$), extracts a smaller value by comparing the greater extracted value the with maximum threshold value ($Th_{max}$), and hence outputs the smaller extracted values as the judder threshold value.

The judder threshold value calculated by the threshold value calculating unit 200 is input to the judder discrimination units 130 and 130a and is used to discriminate the judder.

As illustrated in FIG. 4, if judder is detected using the four or more adjacent input lines, a probability that the judder is erroneously detected is reduced, as opposed to when judder is detected using three adjacent input lines.

While not illustrated, if the judder detection unit 100 includes two or more judder detection units 100 and 100a, as illustrated in FIG. 4, it is possible to extend in horizontal and vertical directions a region in which the judder is detected, by further including the extension unit 140 illustrated in FIG. 3.

Figure 5:
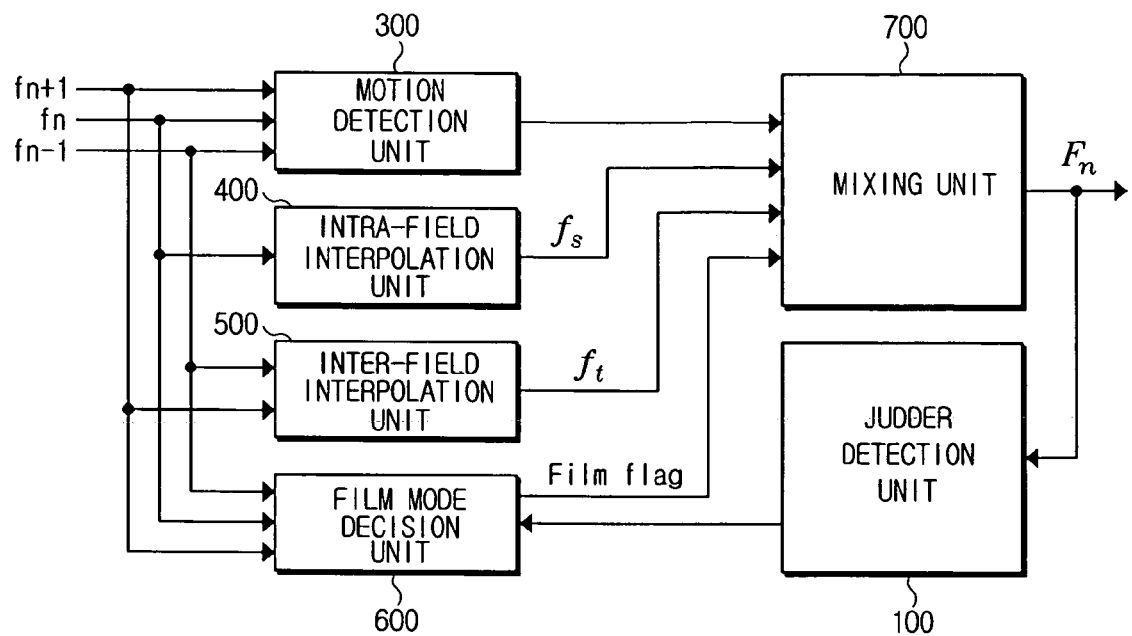
FIG. 5 is a block diagram illustrating a deinterlacing apparatus using judder detection according to another embodiment of the present general inventive concept.

FIG. 5 is a block diagram illustrating a deinterlacing apparatus using judder detection according to another embodiment of the present general inventive concept.

The deinterlacing apparatus using judder detection according to an embodiment of the present general inventive concept includes a motion detection unit 300, an intra-field interpolation unit 400, an inter-field interpolation unit 500, a film mode decision unit 600, a judder detection unit 100, and a mixing unit 700.

The motion detection unit 300 calculates a motion information value between successive temporal fields (a previous field ($f_{n+1}$) and a next field ($f_{n-1}$)) according to a corresponding pixel of the current field ($f_n$) of an input image.

The intra-field interpolation unit 400 uses a gradient correlation of pixel values surrounding a pixel to be interpolated in the current field and outputs a first interpolation value ($f_s$) according to a direction thereof.

The inter-field interpolation unit 500 outputs a second interpolation value ($f_t$) obtained by averaging pixel values of the previous field and the next field that are located corresponding to the pixel to be interpolated in the current field.

The film mode decision unit 600 receives pixel values of the current field, the previous field, and the next field and determines if these pixel values correspond to the film mode (film flag), and then provides an indication of whether an input image source is in the film mode to the mixing unit 700 described below.

As described with reference to FIGS. 1, 3, and 4, the judder detection unit 100 detects judder from the plurality of adjacent lines that are extracted from the current field and the inter-field interpolation unit 500 by way of the median filtering unit 110, the absolute value calculating unit 120, and the judder discrimination unit 130.

The mixing unit 700 mixes the first and second interpolation values from the intra-field interpolation unit 400 and the inter-field interpolation unit 500, respectively, thereby outputting a final output value ($F_n$), also depending on output values of the motion detection unit 300 and the film mode decision unit 600.

In general, if the motion detection unit 300 does not detect motion between the previous field and the next field, and/or if the film mode decision unit 600 determines that the input image source is in the film mode, the mixing unit 700 uses the first interpolation value of the intra-field interpolation unit 400 as the final output value. If judder is detected by the judder detection unit 100, the mixing unit 700 uses the first interpolation value of the intra-field interpolation unit 400 as the final output value.

By disposing the judder detection unit 100 outside the mixing unit 700 of the deinterlacing apparatus, if judder is detected in an output frame of the final output value of the deinterlacing apparatus, it is possible to limit the film mode in the film mode decision unit 600 that causes the judder.

Figure 6:
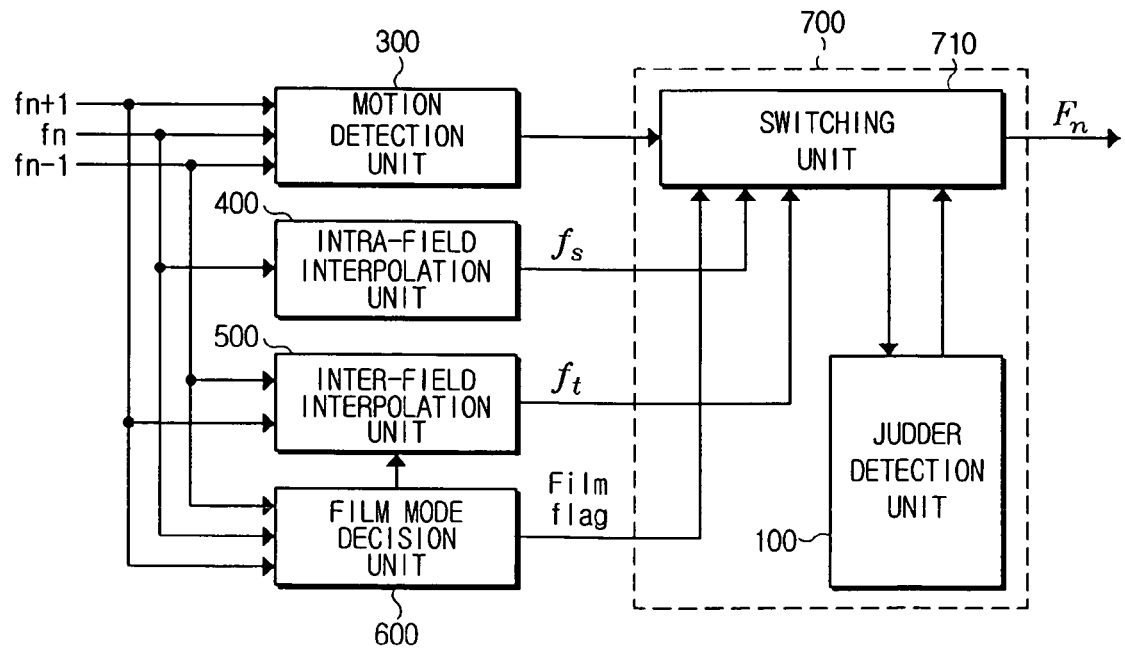
FIG. 6 is a block diagram illustrating another deinterlacing apparatus using judder detection according to another embodiment of the present general inventive concept.

FIG. 6 is a block diagram illustrating another deinterlacing apparatus using judder detection according to another embodiment of the present general inventive concept.

Similar to the embodiment of FIG. 5, the deinterlacing apparatus using judder detection according to another embodiment of the present general inventive concept includes the motion detection unit 300, the intra-field interpolation unit 400, the inter-field interpolation unit 500, and the film mode decision unit 600, however, the judder detection unit 100 is included in the mixing unit 700 and the mixing unit 700 further includes a switching unit 710.

Herein, the description of a configuration similar to FIG. 5 will be omitted, and only differences in the configurations thereof will be described.

The mixing unit 700 includes the judder detection unit 100 and the switching unit 710.

The judder detection unit 100 detects judder and provides it to the switching unit 710.

If the motion detection unit 300 does not detect motion between the previous field and the next field, and/or if the film mode decision unit 600 determines that the input image source is in the film mode, the switching unit 710 outputs the first interpolation value of the inter-field interpolation unit 500 as the final output value. If a judder is detected by the judder detection unit 100, the switching unit 710 outputs the first interpolation value of the intra-field interpolation unit 400 as the final output value.

Figure 7:
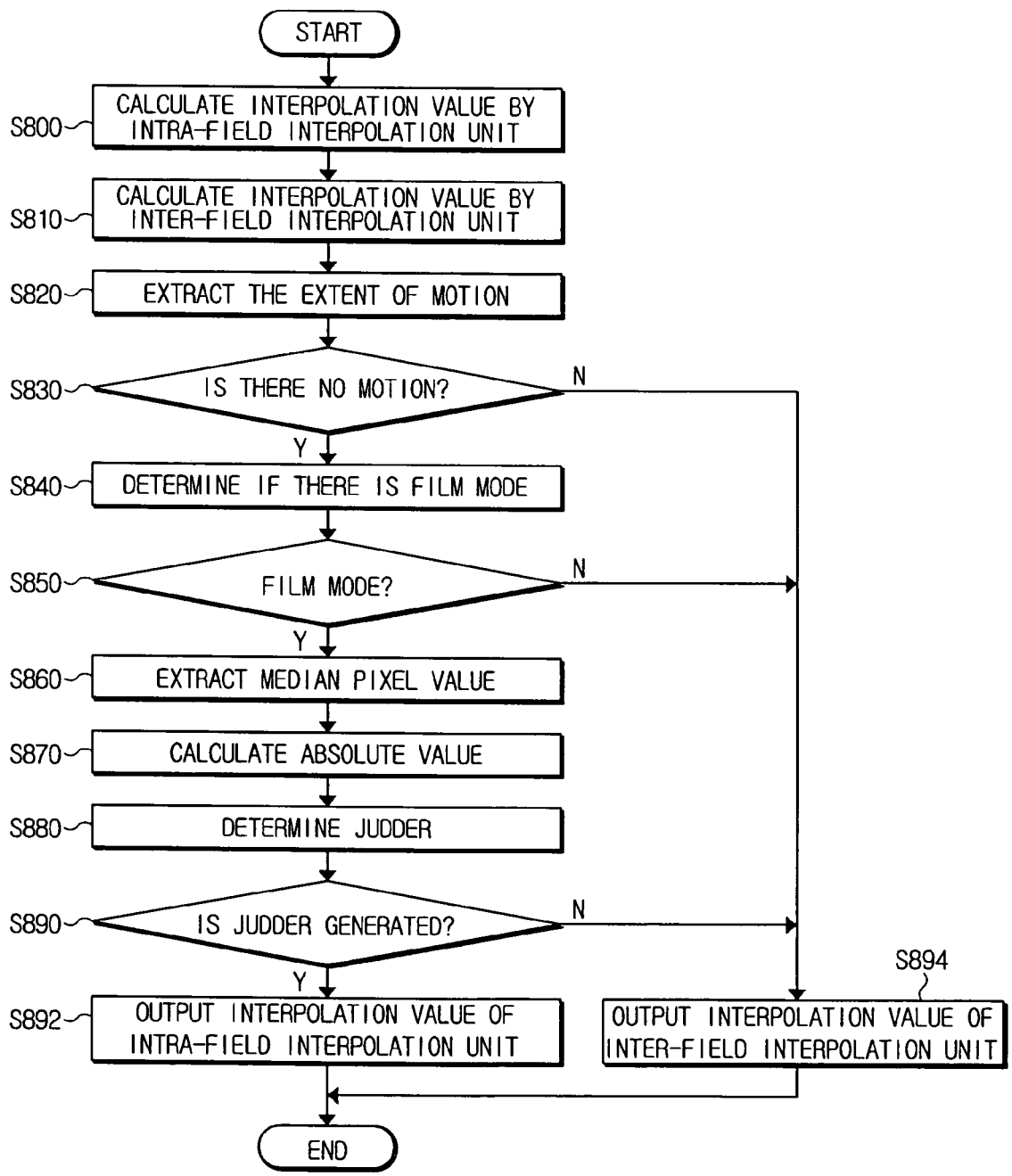
FIG. 7 is a flow diagram illustrating deinterlacing method of detecting judder according to another embodiment of the present general inventive concept.

FIG. 7 is a flow diagram illustrating a deinterlacing method to detect judder according to an embodiment of the present general inventive concept.

Here, with reference to FIGS. 1 to 7, the deinterlacing method using judder detection according to an embodiment of the present general inventive concept will be described.

In operation 800, the intra-field interpolation unit 400 uses a gradient correlation of the pixel values surrounding the pixel to be interpolated in the current field and outputs the first interpolation value according to the direction thereof.

In operation 810, the inter-field interpolation unit 500 outputs the second interpolation value calculated by averaging the pixel values of the previous field and the next field that are located corresponding to the pixel to be interpolated in the current field.

In operation 820, the motion detection unit 300 calculates an extent of motion between successive temporal fields (the previous field ($f_{n+1}$) and the next field ($f_{n-1}$)) corresponding to the pixel to be interpolated in the current field.

In operations 830 and 840, depending on the extent of the motion detected by the motion detection unit 300, if it is determined that there is no motion between the previous field and the next field, the film mode decision unit 600 then determines whether the input image is in a film mode. If the motion detection unit 300 determines that there is motion, the mixing unit 700 outputs the second interpolation value calculated from the inter-field interpolation unit 500 in operations 830 and 894.

If the input image source is determined to be in the film mode in operation 840, the median filtering unit 110 extracts the median pixel value of three adjacent input lines in operations 850 and 860. In operation 870, the absolute value calculating unit 120 calculates the absolute value of the difference between an output value of the median filtering unit 110 and a pixel value of the intermediate line of three adjacent input lines. In operation 880, the judder discrimination unit 130 discriminates the judder by comparing the calculated absolute value and the judder threshold value.

In operations 890 and 892, if the judder discrimination unit 130 determines that there is a judder generated, the judder is output from the judder detection unit 100, and the first interpolation value calculated from the intra-field interpolation unit 400 is output from the mixing unit 700 in the operations 890 and 892.

In operation 890, if the judder discrimination unit 130 determines that there is no judder generated, the mixing unit 700 outputs the second interpolation value of the inter-field interpolation unit 500 in operation 894.

Figure 8:
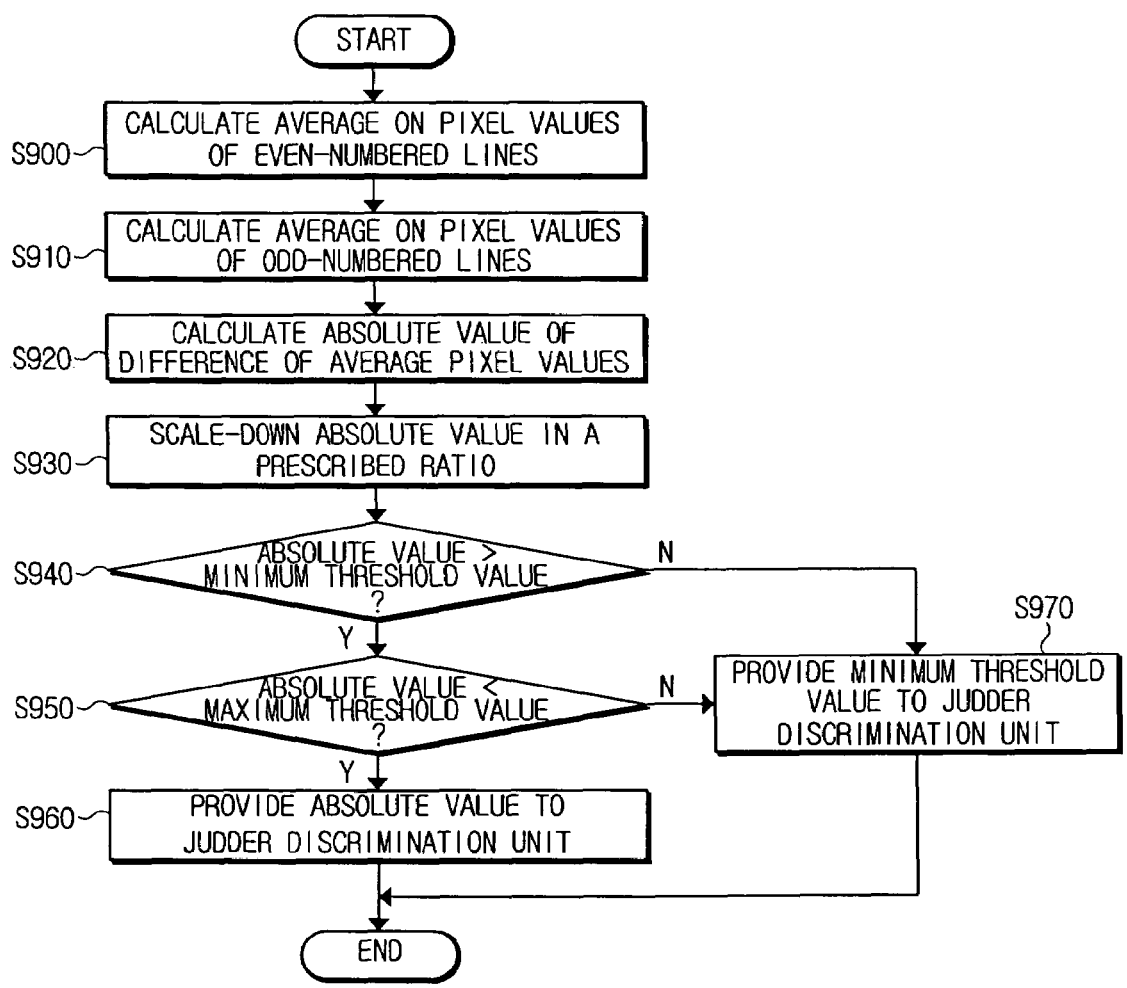
FIG. 8 is a flow diagram illustrating a method of calculating a threshold value according to another embodiment of the present general inventive concept.

FIG. 8 is a flow diagram illustrating a method of calculating a threshold value according to an embodiment of the present general inventive concept.

Herein, with reference to FIGS. 4 and 8, a method of extracting the judder threshold value applied in discriminating the judder in operation 880 of FIG. 7 will be described.

In operation 900, the first average pixel extracting unit 210a calculates the average of the pixel values of the even-numbered lines of the adjacent input lines, and in operation 910, the second average pixel extracting unit 210b calculates the average of the pixel values of the odd-numbered lines of the adjacent input lines.

In operation 920, the absolute value extracting unit 220 calculates the absolute value of the difference of the average pixel values extracted from the first average pixel extracting unit 210a and the second first average pixel extracting unit 210b, respectively.

In operation 930, the limiter 230 scales-down the absolute value calculated from the absolute value extracting unit 220 in a prescribed ratio, and, in operation 940, the limiter 230 compares the scaled-down absolute value to the minimum threshold value.

If it is determined that the absolute value is greater than the minimum threshold value in the operation 940, the absolute value is compared to the maximum threshold value in operation 950. In operation 960, if it is determined that the absolute value is smaller than the maximum threshold value, the absolute value is supplied to the judder discrimination units 130 and 130a as the judder threshold value.

In operation 940, if it is determined that the absolute value is smaller than the minimum threshold value, in operation 970, the minimum threshold value is supplied to the judder discrimination units 130 and 130a as the judder threshold value.

As described in the above, the deinterlacing apparatus and method using judder detection according to embodiments of the present general inventive concept can effectively detect and eliminate a judder generated in the motion region and/or the vicinity of the motion region by using the inter-field interpolation or the intra-field interpolation when in the motion region. The deinterlacing apparatus converts an interlaced field image into progressive frame image, by comprising the judder detection unit that detects the judder from a plurality of lines input from the inter-field interpolation unit and the current field.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A deinterlacing apparatus using judder detection, comprising:
   a motion detection unit to extract an extent of motion between a previous field and a next field according to a corresponding pixel of a current field of an input image;
   a film mode decision unit to determine if an input image source is in a film mode;
   an intra-field interpolation unit to calculate a first interpolation value using surrounding pixel values according to a directional value included in the surrounding pixel values of pixel to be interpolated in the current field;
   an inter-field interpolation unit to calculate a second interpolation value using the pixel values of the previous field and the next field corresponding to the pixel to be interpolated in the current field; and
   a mixing unit to receive three or more adjacent input lines extracted from the current field and at least one line extracted from a field interpolated in the inter-field interpolation unit and to detect judder, and to selectively output one of an output value of the inter-field interpolation unit and an output value of the intra-field interpolation unit depending on the judder detected.

2. The deinterlacing apparatus as recited in claim 1, wherein the mixing unit comprises:
   at least one judder detection unit to detect judder in the three or more adjacent input lines; and
   a switching unit to output the output value of the inter-field interpolation unit if the motion detection unit detects no motion between the previous field and the next field and if the film determination unit determines that the input image source is in the film mode, and to output the output value of the intra-field interpolation unit if judder is detected by the judder detection unit.

3. The deinterlacing apparatus as recited in claim 2, wherein the judder detection unit comprises:
   a median filtering unit to extract a median pixel value from the three or more adjacent input lines;
   an absolute value calculating unit to calculate an absolute value of a difference between the extracted median pixel value and a pixel value of an intermediate line of the three or more adjacent input lines; and
   a judder discrimination unit to compare the calculated absolute value and a judder threshold value and to discriminate the judder.

4. The deinterlacing apparatus as recited in claim 3, further comprising:
   an extension unit to extend a region, in which the judder is detected, in horizontal and vertical directions, and to output detected judder if an output value of the judder discriminating unit in the extended judder detection region is greater than the judder threshold value.

5. The deinterlacing apparatus as recited in claim 3, further comprising:
   a threshold value calculating unit to calculate the judder threshold value from pixel values of the three or more adjacent input lines and a predetermined threshold value, and to provide the judder threshold value to the judder discrimination unit.

6. The deinterlacing apparatus as recited in claim 5, wherein the threshold value calculating unit comprises:
   a first average pixel extracting unit to calculate an average of the pixel values of odd-numbered lines of the three or more adjacent input lines;
   a second average pixel extracting unit to calculate an average of the pixel values of even-numbered lines of the three or more adjacent input lines;
   an absolute value extracting unit to calculate an absolute value of a difference between the calculated average pixels of the pixel values of the odd-numbered lines and the calculated average pixels of the pixel values of the even-numbered lines; and
   a limiter to limit the calculated absolute value by the predetermined threshold value having a maximum threshold value and a minimum threshold value.

7. The deinterlacing apparatus as recited in claim 6, wherein the limiter scales-down the calculated absolute value in a prescribed ratio, compares the scaled-down absolute value and the minimum threshold value, thereby extracting a greater value, compares the extracted greater value and the maximum threshold value, thereby extracting a smaller value, and provides the extracted smaller value as the judder threshold value to the judder discrimination unit.

8. A deinterlacing apparatus to receive an interlaced input image having a plurality of fields, the deinterlacing apparatus comprising:
   a determination unit to determine at least one of whether there is motion in a current field of the interlaced input image and whether a source that inputs the interlaced input image is in a film mode;
   an inter-field interpolation unit to interpolate pixel values of surrounding fields of the interlaced input image;
   an intra-field interpolation unit to interpolate the pixel values of the current field;
   a mixing unit to output an intra-field interpolation of the intra-field interpolation unit if the determination unit determines that there is no motion in the current field of the interlaced input image or that the source that inputs the interlaced input image is in the film mode, and to output an inter-field interpolation of the inter-field interpolation unit if the determination unit determines that there is motion in the current field and that the source that inputs the interlaced input image is not in film mode.

9. The deinterlacing apparatus according to claim 8, wherein the determination unit comprises:
   a motion detection unit to detect whether there is motion in the current field by comparing a pixel of the current field with corresponding pixels of a previous field and a next field; and
   a film mode decision unit to determine whether the source that inputs the interlaced input image is in the film mode.

10. The deinterlacing apparatus according to claim 8, wherein the output of the mixing unit contains a judder if the mixing unit outputs the intra-field interpolation when there is motion in the current field of the interlaced input image or when the source that inputs the interlaced input image is not in the film mode.

11. The deinterlacing apparatus according to claim 8, wherein the mixing unit comprises:
   a switching unit to selectively switch the output of the mixing unit between the inter-field interpolation and the intra-field interpolation; and at least one judder detection unit to receive three or more adjacent input lines from the switching unit and the three or more adjacent input lines extracted from the current field and at least one line from the inter-field interpolation, to detect judder, and to feed back the judder detected to the switching unit so that the judder detected controls the switching unit.

12. The deinterlacing apparatus according to claim 11, wherein if judder is detected by the at least one judder detection unit the judder detected causes the switching unit to switch the output of the mixing unit to the intra-field interpolation.

13. The deinterlacing apparatus according to claim 8, further comprising:
at least one judder detection unit to receive three or more adjacent input lines from the output of the mixing unit including lines extracted from the current field and at least one line from the inter-field interpolation, to detect judder, and to feed back the judder detected to the determination unit.

14. The deinterlacing apparatus according to claim 13, wherein if the judder is detected by the at least one judder detection unit, the determination unit determines that the source that inputs the interlaced input image is not in the film mode.

15. The deinterlacing apparatus according to claim 14, wherein if the determinationunit determines that the source that inputs the interlaced input image is not in the film mode, the mixing unit outputs the intra-field interpolation.

16. The deinterlacing apparatus according to claim 13, wherein the at least one judder detection unit comprises:
a median filtering unit to receive the three or more adjacent input lines from the output of the mixing unit and the three or more adjacent input lines, and to extract a median pixel value from the three or more adjacent input lines;
an absolute value calculating unit to calculate an absolute value of a difference between the median pixel value extracted by the median filtering unit and a pixel value of an intermediate line of the three or more adjacent input lines; and
a judder discrimination unit to compare the calculated absolute value with a judder threshold value to determine whether a predetermined level of judder exists.

17. The deinterlacing apparatus according to claim 16, wherein the at least one judder detection unit further comprises a threshold value calculating unit to calculate the judder threshold value from pixel values of the three or more adjacent input lines and a predetermined threshold value and to provide the judder threshold value to the judder discrimination unit.

18. The deinterlacing apparatus according to claim 17, wherein the threshold value calculating unit comprises:
a first average pixel extracting unit to calculate a first average of pixel values of odd-numbered lines of the three or more adjacent input lines;
a second average pixel extracting unit to calculate a second average of pixel values of even-numbered lines of the three or more adjacent input lines;
an absolute value extracting circuit to calculate an absolute value of a difference between the first average and the second average; and
a limiter to limit the calculated absolute value according to the predetermined threshold including a maximum threshold and a minimum threshold and to provide the limited absolute value as the judder threshold value to the judder discrimination unit.

19. A deinterlacing apparatus using judder detection to eliminate judder when deinterlacing an input image, the apparatus comprising:
a determination unit to receive the input image having a current field, a next field, and a previous field and to determine a motion characteristic of the input image;
an intra-field interpolation unit to calculate a first interpolation value using surround pixel values according to a direction included in the surrounding pixel values of a pixel to be interpolated in the current field of the input image;
an inter-field interpolation unit to calculate a second interpolation value using pixel values of the next field and the previous field that correspond to the pixel to be interpolated in the current field of the input image; and
a mixing unit to selectively output the first interpolation value and the second interpolation value according to the motion characteristic determined by the determination unit.

20. The deinterlacing apparatus according to claim 19, wherein the motion characteristic of the input image comprises at least one of:
whether there is motion between the next field and the previous field of the input image; and
whether the input image is in a film mode.

21. The deinterlacing apparatus according to claim 20, wherein the mixing unit outputs the first interpolation value if the determination unit determines that there is no motion in the input image or that the input image is in a film mode.

22. The deinterlacing apparatus according to claim 19, wherein the determination unit comprises:
a motion detection unit to detect whether there is motion in the input image by comparing pixel values of the current field with corresponding pixel values of the previous field and the next field; and
a film mode decision unit to determine whether a source that inputs the input image is in a film mode.

23. The deinterlacing apparatus according to claim 20, wherein the output of the mixing unit contains judder if the mixing unit outputs the first interpolation value when there is motion in the input image or when the input image is not in the film mode.

24. The deinterlacing apparatus according to claim 19, wherein the mixing unit comprises:
a switching unit to selectively switch the output of the mixing unit between the first interpolation value and the second interpolation value; and
at least one judder detection unit to receive three or more adjacent input lines from the switching unit, to detect judder therein, and to feed back judder detected to the switching unit so that the judder detected controls the switching unit.

25. The deinterlacing apparatus according to claim 24, wherein if judder is detected by the at least one judder detection unit, the judder detected causes the switching unit to switch the output of the mixing unit to the second interpolation value.

26. The deinterlacing apparatus according to claim 19, further comprising:
at least one judder detection unit to receive three or more adjacent input lines from the output of the mixing unit, to detect judder therein, and to feed back judder detected to the determination unit.

27. The deinterlacing apparatus according to claim 26, wherein if judder is detected by the at least one judder detection unit the judder detected causes the determination unit to determine a different motion characteristic so that the mixing unit changes outputs.

28. The deinterlacing apparatus according to claim 26, wherein if judder is detected by the at least one judder detection unit, the judder detected causes the determination unit to determine that the input image is not in the film mode.

29. The deinterlacing apparatus according to claim 28, wherein if the determination unit determines that the input image is not in the film mode, the mixing unit outputs the intra-field interpolation.

30. The deinterlacing apparatus according to claim 26, wherein the at least one judder detection unit comprises:
a median filtering unit to receive the three or more adjacent input lines from the output of the mixing unit and the three or more adjacent lines including lines extracted from the current field of the input image and at least one line from the second interpolation value, and to extract a median a median pixel value from the three or more adjacent input lines;
an absolute value calculating unit to calculate an absolute value of a difference between the median pixel value extracted by the median filtering unit and a pixel value of an intermediate line of the three or more adjacent input lines; and
a judder discrimination unit to compare the calculated absolute value with a judder threshold value to determine whether a predetermined level of judder exists.

31. A deinterlacing method using judder detection, comprising the operations of:
calculating a first interpolation value using surrounding pixel values according to a directional value included in the surrounding pixel values of a pixel to be interpolated in a current field of an input image;
calculating a second interpolation value using pixel values of a previous field and a next field corresponding to the pixel to be interpolated in the current field of the input image;
extracting an extent of motion between the previous field and the next field according to a pixel of the current field;
determining if an input image source is in a film mode;
receiving three or more adjacent input lines extracted from the current field and at least one line extracted from a field interpolated according to the second interpolation value and detecting judder therefrom; and
outputting an output value interpolated according to the first interpolation value if the input image is determined to have no motion or if the input image source is determined to be in the film mode, and outputting the output value interpolated according to the first interpolation value if judder is detected.

32. The deinterlacing method as recited in claim 31, wherein the operation of detecting judder comprises the operations of:
extracting a median pixel value from the three or more adjacent input lines;
calculating an absolute value of a difference between the extracted median pixel value and a pixel value of an intermediate line of the three or more adjacent input lines; and
comparing the calculated absolute value and a judder threshold value, and discriminating the judder.

33. The deinterlacing apparatus as recited in claim 31, further comprising:
extending a region, in which the judder is detected, in horizontal and vertical directions, and outputting the judder if the judder detected in the extended judder detection region is greater than the judder threshold value.

34. The deinterlacing method as recited in claim 32, further comprising:
calculating a threshold value as the judder threshold value based on a predetermined threshold value including a maximum and a minimum threshold value and values of the three or more adjacent input lines.

35. The deinterlacing method as recited in claim 34, wherein the calculating of the threshold value comprises:
calculating average pixel values of the even-numbered lines of the three or more adjacent input lines;
calculating average pixel values of the odd-numbered lines of the three or more adjacent input lines;
calculating an absolute value of a difference between the calculated average pixel values of the even-numbered lines and the calculated average pixel values of the odd-numbered lines; and
limiting the calculated absolute value by the maximum threshold value and the minimum threshold value.

36. The deinterlacing method as recited in claim 35, wherein the limiting of the absolute values comprises:
scaling-down the calculated absolute value in a prescribed ratio;
comparing the scaled-down absolute value and the minimum threshold value so that a greater value is extracted; and
comparing the greater extracted value and the maximum threshold value so that a smaller value is extracted.

37. A deinterlacing method of using judder detection to eliminate judder when deinterlacing an interlaced input image, the method comprising:
receiving an input image having a current field, a next field, and a previous field;
determining a motion characteristic of the input image;
calculating a first interpolation value using surrounding pixel values according to a direction included in the surrounding pixel values of a pixel to be interpolated in the current field of the input image;
calculating a second interpolation value using pixel values of the next field and the previous field that correspond to the pixel to be interpolated in the current field of the input image; and
selectively outputting the first interpolation value and the second interpolation value according to the determined motion characteristic.

38. The method according to claim 37, wherein the motion characteristic includes information comprising at least one of:
whether there is motion between the next field and the previous field of the input image; and
whether the input image is in a film mode.

39. The method according to claim 38, wherein the first interpolation value is output if there is no motion in the input image or if the input image is in a film mode.

40. The method according to claim 37, wherein determining a motion characteristic of the input image comprises:
detecting whether there is motion in the input image by comparing pixel values of the current field with pixel values of the next field and the previous field; and
determining whether a source that inputs the input image is in a film mode.

41. The method according to claim 38, wherein the output contains judder if the first interpolation value is output and if there is motion in the input image or the input image is not in film mode.

42. The method according to claim 37, wherein selectively outputting the first interpolation value and the second interpolation value further comprises:
  detecting judder at the output; and
  switching the output between the first interpolation value and the second interpolation value according to detected judder.

43. The method according to claim 42, wherein if a judder is detected, the output is switched to the first interpolation value.

44. The method according to claim 37, further comprising:
  detecting judder in three or more adjacent lines received from the output and the three or more adjacent lines include lines extracted from the current field and at least one line from the second interpolation value.

45. The method according to claim 44, wherein detecting judder further comprises:
  receiving the three or more adjacent input lines from the output and extracting a median pixel value from the three or more adjacent lines;
  calculating an absolute value of a difference between the median pixel value extracted and a pixel value of an intermediate line of the three or more adjacent input lines; and
  comparing the calculated absolute value with a judder threshold to determine whether a predetermined level of judder exists.

46. The method according to claim 45, wherein detecting judder further comprises calculating the judder threshold from pixel values of the three or more adjacent input lines and a predetermined threshold value.

47. The deinterlacing apparatus according to claim 46, wherein calculating the judder threshold comprises:
  calculating a first average of pixel values of odd-numbered lines of the three or more adjacent input lines;
  calculating a second average of pixel values of even-numbered lines of the three or more adjacent input lines;
  calculating an absolute value of a difference between the first average and the second average; and
  limiting the calculated absolute value according to the predetermined threshold including a maximum threshold and a minimum threshold.

48. The method according to claim 44, wherein if a judder is detected a different motion characteristic is determined.

49. The method according to claim 44, wherein if a judder is detected the first interpolation value is output.

50. The method according to claim 37, wherein the first interpolation value is a gradient of the surrounding pixel values.

51. The method according to claim 37, wherein the second interpolation value is an average of pixel values of the next field and the previous field that correspond to the pixel to be interpolated in the current field.

52. A method of using judder detection to eliminate judder when deinterlacing an interlaced input image having a plurality of fields, the method comprising:
  interpolating pixel values of a current field of the interlaced input image with respect to the pixel values of the current field to determine a first value and interpolating the pixel values of the current field of the interlaced input image with respect to pixel values of surrounding fields to determine a second value;
  determining if there is motion in the current field;
  if there is motion in the current field, outputting the second value as a system output; and
  if there is no motion in the current field, outputting the first value as the system output.

53. The method according to claim 52, further comprising:
  detecting a judder; and
  if there is the judder, outputting the first value as the system output.

54. A deinterlacing apparatus, comprising:
  a first unit to detect motion in an input image having a plurality of fields;
  a second unit to calculate a first interpolation value according to pixels surrounding a pixel to be interpolated in a current field of the input image;
  a third unit to calculate a second interpolation value using pixel values of a previous field and a next field that correspond to the pixel to be interpolated; and
  a fourth unit to selectively output the first interpolation value and the second interpolation value according to whether motion is detected in the input image,
  wherein the fourth unit outputs the second interpolation value if motion is detected in the input image.

55. The deinterlacing apparatus according to claim 54, further comprising a fifth unit to detect judder the selective output and to cause the fourth unit to change the first interpolation value and the second interpolation value.

56. A deinterlacing apparatus to receive an interlaced input image, comprising:
  an inter-field interpolation unit to interpolate pixel values of surrounding fields of a current field;
  an intra-field interpolation unit to interpolate pixel values of the current field;
  a judder detection unit to determine a judder in at least one of the current fields and the surrounding fields; and
  a mixer unit to output an output of the intra-field interpolation unit as a final value when the judder exists, and to output an output of the inter-field interpolation unit as the final value when the judder does not exist.

57. The apparatus according to claim 56, further comprising:
  a determination unit to determine whether the interlaced input image is in a film mode,
  wherein the mixer unit outputs the output of the inter-field interpolation unit as the final value when the interlaced input image is not in the film mode, and outputs the output of the intra-field interpolation unit as the final value when the interlaced input image is in the film mode.

58. The apparatus according to claim 56, further comprising:
  a determination unit to determine whether the interlaced input image includes a motion between the surrounding fields,
  wherein the mixer unit outputs the output of the inter-field interpolation unit as the final value when the interlaced input image includes the motion, and outputs the output of the intra-field interpolation unit as the final value when the interlaced input image does not include the motion.

* * * * *